United States Patent
Burckart et al.

(10) Patent No.: US 8,782,667 B2
(45) Date of Patent: Jul. 15, 2014

(54) WEATHER ADAPTIVE ENVIRONMENTALLY HARDENED APPLIANCES

(75) Inventors: Erik J. Burckart, Raleigh, NC (US); Gennaro Cuomo, Cary, NC (US); Andrew J. Ivory, Wake Forest, NC (US); Victor S. Moore, Lake City, FL (US); Aaron K. Shook, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 720 days.

(21) Appl. No.: 12/979,163

(22) Filed: Dec. 27, 2010

(65) Prior Publication Data

US 2012/0167093 A1    Jun. 28, 2012

(51) Int. Cl.

| | |
|---|---|
| G06F 12/00 | (2006.01) |
| G06F 12/08 | (2006.01) |
| G06F 13/00 | (2006.01) |
| G06F 13/28 | (2006.01) |
| G06F 9/46 | (2006.01) |
| G06F 3/00 | (2006.01) |
| G06F 9/44 | (2006.01) |

(52) U.S. Cl.
USPC ............... 719/318; 711/3; 711/118; 718/100; 718/102; 718/104; 719/312; 719/320

(58) Field of Classification Search
None
See application file for complete search history.

(56) References Cited

U.S. PATENT DOCUMENTS

| | | | | |
|---|---|---|---|---|
| 5,570,270 | A  * | 10/1996 | Naedel et al. | ............ 361/679.46 |
| 7,233,880 | B2 * | 6/2007 | Coulson et al. | ............... 702/186 |
| 2010/0217454 | A1 * | 8/2010 | Spiers et al. | .................. 700/300 |

* cited by examiner

*Primary Examiner* — Emerson Puente
*Assistant Examiner* — Jonathan R Labud
(74) *Attorney, Agent, or Firm* — Steven M. Greenberg, Esq.; CRGO Law

(57) ABSTRACT

Embodiments of the present invention provide a method, system and computer program product for weather adaptive environmentally hardened appliances. In an embodiment of the invention, a method for weather adaptation of an environmentally hardened computing appliance includes determining a location of an environmentally hardened computing appliance. Thereafter, a weather forecast including a temperature forecast can be retrieved for a block of time at the location. As a result, a cache policy for a cache of the environmentally hardened computing appliance can be adjusted to account for the weather forecast.

10 Claims, 1 Drawing Sheet

WEATHER ADAPTIVE ENVIRONMENTALLY HARDENED APPLIANCES

BACKGROUND OF THE INVENTION

1. Field of the Invention

The present invention relates to ruggedized computing and more particularly to environmentally hardened computing appliances.

2. Description of the Related Art

The general computing environment is one that is controlled in terms of moisture, pressure, contaminate concentration and temperature. The ordinary computer typically is deployed into an office or home environment where environmental factors remain nearly constant. As such, manufacturers of computing equipment provide a reasonable operating range for computing equipment suitable for the indoor controlled temperature and humidity environment without regard to more extreme environmental conditions found in the outdoors or within an industrial setting like a factory or shop floor.

A sub-market of computing equipment, however, has evolved to address the harsher environmental conditions of industry. In these cases, computing equipment can be "environmentally hardened" which means computing equipment can be manufactured and assembled to withstand adverse environmental conditions such as excessively hot or cold temperature environments encountered in a factory or outdoor setting, humidity and moisture environments found in largely un-air-conditioned factory spaces, or excessively dusty environments typical of a factory shop floor. Remedial measures used to environmentally harden computing equipment often include sealed componentry for waterproofing and dust proofing, additional fans and circulatory features to encourage cooling in an excessively hot environment, or insulative materials used in excessively cold environments.

For a ruggedized computing appliance, temperature can be of paramount concern. However, while the exterior environment is a key component of the temperature experienced by the computing appliance, so too is the heat generated by computing appliance in the course of operation. In this regard, the constant utilization of a hard disk drive in addition to the shear temperature of one or more processors of the computing appliance can result in the temperature of the interior portions of the computing appliance largely stemming from the operation of the appliance itself. The impact upon the appliance of the exterior temperature of the environment in many cases can be the difference between the failure of the appliance and the continued operation of the appliance.

BRIEF SUMMARY OF THE INVENTION

Embodiments of the present invention address deficiencies of the art in respect to ruggedized computing and provide a novel and non-obvious method, system and computer program product for weather adaptive environmentally hardened appliances. In an embodiment of the invention, a method for weather adaptation of an environmentally hardened computing appliance includes determining a location of an environmentally hardened computing appliance. Thereafter, a weather forecast including a temperature forecast can be retrieved for a block of time at the location. As a result, a cache policy for a cache of the environmentally hardened computing appliance can be adjusted to account for the weather forecast.

In one aspect of the embodiment, adjusting a cache policy for a cache of the environmentally hardened computing appliance to account for the weather forecast can include adjusting the cache policy for the cache by targeting a lower cache hit rate responsive to a weather forecast of hotter temperatures at the location. Conversely, in another aspect of the embodiment, adjusting a cache policy for a cache of the environmentally hardened computing appliance to account for the weather forecast can include adjusting the cache policy for the cache by targeting a higher cache hit rate responsive to a weather forecast of cooler temperatures at the location. In the former circumstance, adjusting the cache policy for the cache by targeting a lower cache hit rate responsive to a weather forecast of hotter temperatures at the location can include loading cache metrics for the cache specifying a number of central processing unit (CPU) cycles consumed serving a piece of data from the cache, a cache hit rate for data in the cache, and a quantity of heat produced for each CPU cycle, computing based upon the cache metrics a number of cache hits desired to reduce heat production in servicing cache requests in the cache, and adjusting the cache policy to induce the computed number of cache hits responsive to a weather forecast of hotter temperatures at the location.

In another embodiment of the invention, an environmentally hardened computing appliance can be provided. The appliance can include an environmentally hardened computer with at least one processor and memory and a cache disposed in the computer. A cache policy can be included as well to induce cache hit rates for data in the cache. Finally, a weather adaptive cache management module can be coupled to the computer. The cache management module can include program code enabled to determine a location of the computer, retrieve a weather forecast for the location, and adjust the cache policy to account for the weather forecast.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for weather adaptation of an environmentally hardened computing appliance. In accordance with an embodiment of the invention, anticipated weather conditions for a computing location can be determined. Thereafter, in response to determining hot weather, a cache policy for a computer in the computing location can be adjusted to discourage caching during the hot weather, but the cache policy for the computer in the computing location can be adjusted to encourage caching during cooler weather. In this way, the heat production of the computer produced in consequence of caching operations in the computer can be adapted to account for environmental temperature changes at the computing location.

Figure 1:
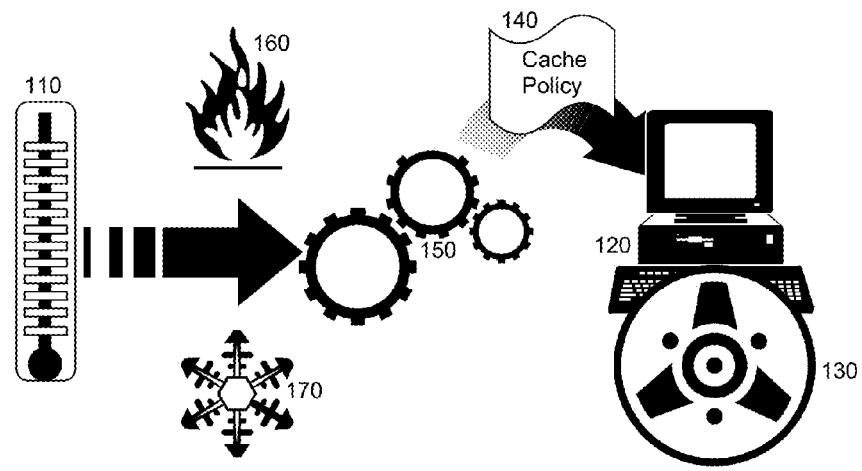
FIG. 1 is a pictorial illustration of a process for weather adaptation of an environmentally hardened computing appliance.

In further illustration, FIG. 1 is a pictorial illustration of a process for weather adaptation of an environmentally hardened computing appliance. As shown in FIG. 1, weather conditions can be monitored for a location of an environmentally hardened device. Specifically, a weather sensor 110 such as a temperature reading device can be consulted to determine temperature conditions at a location of an environmentally hardened computing appliance 120. A weather adaptive cache manager 150 managing a caching policy 140 for a caching system 130 of the environmentally hardened computing appliance 120 can adjust the caching policy 140 if a threshold hot temperature 160 is forecast for the location of the hardened computing appliance 120. Alternatively, the weather adaptive cache manager 150 can adjust the caching policy 140 responsive to a threshold cold temperature 170 forecast for the location of the hardened computing appliance 120. In this way, caching activity in the caching system 130 can be adjusted in concert with changes in forecast temperature for the location so as to not compound the risk of appliance failure resulting from excessive heat or cold forecast for the location of the environmentally hardened appliance.

Figure 2:
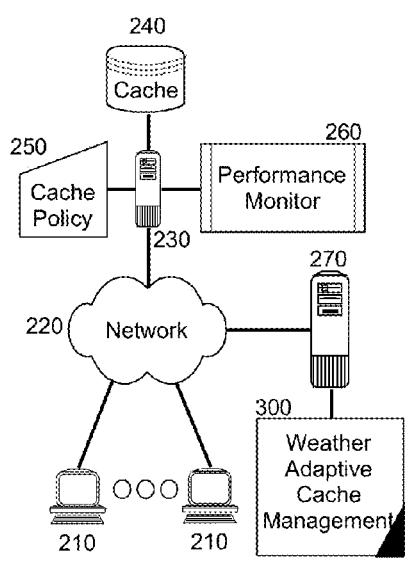
FIG. 2 is a schematic illustration of a computer data processing system configured for weather adaptation; and, FIG. 3 is a flow chart illustrating a process for weather adaptation of an environmentally hardened computing appliance.

The process described in connection with FIG. 2 can be implemented in a computer data processing system environmentally hardened for deployment. In yet further illustration, FIG. 2 schematically shows a computer data processing system configured for weather adaptation. The system can include an environmentally hardened computing appliance 230 with at least one processor and memory providing access to a cache 240 according to a cache policy 250 specifying criteria for admitting data into the cache 240 and when to evict data from the cache 240. The environmentally hardened computing appliance 230 can be configured for communicative coupling to different clients 210 interacting with data in the cache 240 of the environmentally hardened computing appliance 230 from over a computer communications network 220 such as the global Internet.

A performance monitor 260 can be coupled to the environmentally hardened computing appliance 230. The performance monitor 260 can be configured to monitor the number of CPU cycles consumed in serving a single piece of data from the cache 240. Further, the performance monitor 260 can be configured to determine a hit rate for data in the cache 240. In this way, knowing how much heat is generated for each CPU cycle in the environmentally hardened computing appliance 230, the cache policy 250 for the cache 240 can be adjusted accounting for the consumption of the CPU cycles to throttle a number of cache requests serviced by the cache 240 so as to avoid overheating in the environmentally hardened computing appliance 230.

In this regard, a weather adaptive cache management module 300 can execute in the memory of a host computer 270 (that optionally can be the environmentally hardened computing appliance 230). The module 300 can include program code that when executed in memory of a computer, can retrieve a weather forecast for a location of the environmentally hardened computing appliance 230. The weather forecast can include a forecast temperature for the location of the environmentally hardened computing appliance 230 for a given period of time. The program code further can be enabled to compute a requisite reduction in heat production by the environmentally hardened computing appliance 230 and to further compute a required reduction in cache hits in the cache 240 to achieve the desired reduction in heat production. Thereafter, the cache policy 250 can be modified to induce the computed required reduction in the number of cache hits in the cache 240. Conversely, for forecast periods of cooler weather at the location of the environmentally hardened computing appliance 230, the program code can be enabled to induce an enhanced number of cache hits in the cache 240, or optionally the program code can be enabled to maximize usage of the cache 240.

Figure 3:
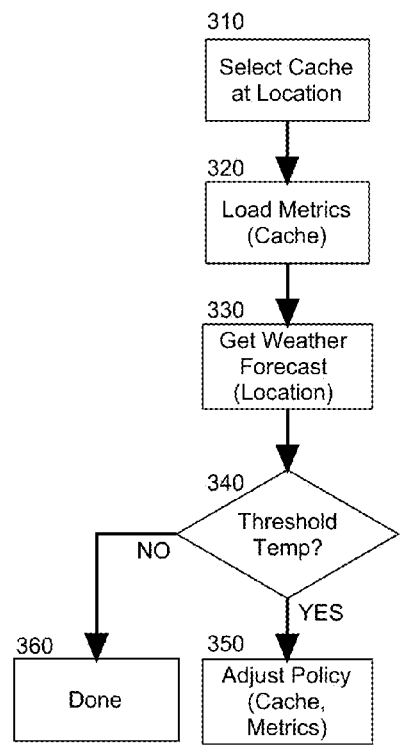

In even yet further illustration of the operation of the weather adaptive cache management module 300, FIG. 3 is a flow chart illustrating a process for weather adaptation of an environmentally hardened computing appliance. Beginning in block 310, a cache for an environmentally hardened computing appliance at a particularly geographic location can be selected for processing. In block 320, cache metrics for the cache can be loaded, such as a number of CPU cycles consumed in servicing a single cache hit, the amount of heat produced by a CPU cycle, and a cache hits rate for a particular piece of data. In block 330, a weather forecast, including temperature, can be retrieved for the location for a particular block of time.

In decision block 340, it can be determined whether or not the temperature of the weather forecast crosses a threshold value. If not, the process can end in block 360. Otherwise, in block 350 a cache policy for the cache can be adjusted to target a number of cache hits for data in the cache so as to produce a certain number of CPU cycles and thereby a particular quantity of heat by the environmentally hardened computing appliance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. An environmentally hardened computing appliance comprising:
   an environmentally hardened computer with at least one processor and memory;
   a cache disposed in the computer;
   a cache policy inducing cache hit rates for data in the cache; and,
   a weather adaptive cache management module coupled to the computer, the cache management module comprising program code enabled to determine a location of the computer, retrieve a weather forecast for the location, and adjust the cache policy by changing a targeted cache hit rate of the cache to account for the weather forecast.

2. The system of claim 1, wherein the weather forecast comprises a temperature forecast for the location for a block of time.

3. The system of claim 2, wherein the program code of the module adjusts the cache policy by targeting a lower cache hit rate responsive to a weather forecast of hotter temperatures at the location.

4. The system of claim 2, wherein the program code of the module adjusts the cache policy by targeting a higher cache hit rate responsive to a weather forecast of cooler temperatures at the location.

5. The system of claim 3, further comprising a performance monitor collecting cache metrics for the cache that specifies a number of central processing unit (CPU) cycles consumed serving a piece of data from the cache, a cache hit rate for data in the cache, and a quantity of heat produced for each CPU cycle, wherein the program code of the module adjusts the cache policy for the cache by computing based upon the cache metrics a number of cache hits desired to reduce heat production in servicing cache requests in the cache and adjusting the cache policy to induce the computed number of cache hits responsive to a weather forecast of hotter temperatures at the location.

6. A computer program product for weather adaptation of an environmentally hardened computing appliance, the computer program product comprising:
 a computer readable storage medium comprising a hardware storage device having computer readable code embodied therewith, the computer readable program code comprising:
 computer readable program code for determining a location of an environmentally hardened computing appliance;
 computer readable program code for retrieving a weather forecast for the location; and,
 computer readable program code for adjusting a cache policy for a cache of the environmentally hardened computing appliance by changing a targeted cache hit rate of the cache to account for the weather forecast.

7. The computer program product of claim 6, wherein the computer readable program code for retrieving a weather forecast for the location comprises computer readable program code for retrieving a temperature forecast for the location.

8. The computer program product of claim 7, wherein the computer readable program code for adjusting a cache policy for a cache of the environmentally hardened computing appliance to account for the weather forecast, comprises computer readable program code for adjusting the cache policy for the cache by targeting a lower cache hit rate responsive to a weather forecast of hotter temperatures at the location.

9. The computer program product of claim 7, wherein the computer readable program code for adjusting a cache policy for a cache of the environmentally hardened computing appliance to account for the weather forecast, comprises computer readable program code for adjusting the cache policy for the cache by targeting a higher cache hit rate responsive to a weather forecast of cooler temperatures at the location.

10. The computer program product of claim 8, wherein the computer readable program code for adjusting the cache policy for the cache by targeting a lower cache hit rate responsive to a weather forecast of hotter temperatures at the location, comprises:
 computer readable program code for loading cache metrics for the cache specifying a number of central processing unit (CPU) cycles consumed serving a piece of data from the cache, a cache hit rate for data in the cache, and a quantity of heat produced for each CPU cycle;
 computer readable program code for computing based upon the cache metrics a number of cache hits desired to reduce heat production in servicing cache requests in the cache; and,
 computer readable program code for adjusting the cache policy to induce the computed number of cache hits responsive to a weather forecast of hotter temperatures at the location.

\* \* \* \* \*